United States Patent [19]
Hsiao

[11] Patent Number: 5,848,137
[45] Date of Patent: Dec. 8, 1998

[54] DEVICE AND METHOD FOR PROCESSING MULTIMEDIA MESSAGE

[76] Inventor: Ray-Ling Hsiao, 4F, No.12,Alley 15, Lane 175, Sec.2,Ho-Ping E.Rd., Taipei, Taiwan

[21] Appl. No.: 862,030

[22] Filed: May 22, 1997

[51] Int. Cl.⁶ .................................................. H04M 11/00
[52] U.S. Cl. .................................. 379/110.01; 379/93.23; 379/100.06
[58] Field of Search .............................. 379/93.05–93.09, 379/93.11, 93.14, 93.15, 93.17, 93.23, 93.24, 93.37, 100.01, 100.03–100.06, 100.08, 110.01, 100.15

[56] References Cited

U.S. PATENT DOCUMENTS 5,631,745  5/1997  Wong et al. ..................... 379/100.15
5,757,891  5/1998  Wang ................................. 379/93.24

*Primary Examiner*—Wing F. Chan
*Attorney, Agent, or Firm*—W. Wayne Liauh

[57] ABSTRACT

An intermediate type of processing device for managing multimedia messages and a method to realize are disclosed. The processing device providing a friendly interface to the user, includes an input/output device to connect to telephone line, Internet, and a computer; a display device to show information; a control unit to determine the message type and handle the message; a storage unit to store the message; and a control panel device for the user to set command to control the processing device. The processing device can serve as a port for the multimedia messages to temporarily reside and then to be checked and integrated for next advanced treatment. There is no worry about losing any important information and the network invaders can not easily gain access to the computer. The processing device supplies an intimate interface easy to operate for users, which is just similar to common home appliances.

11 Claims, 4 Drawing Sheets

| NO. | TYPE | INPUT TIME | TITLE | STATUS |
|---|---|---|---|---|
| 1 | V | 12:30 1/30/97 | — | S |
| 2 | E | 12:50 1/30/97 | Hello | S |
| 3 | F | 02:13 2/1/97 | 886-2-2031719 | P |
| 4 | F | 16:42 2/1/97 | — | S |
| 5 | V | 23:21 2/1/97 | — | — |
| 6 | T | 08:55 2/2/97 | TOWER.BMP | T |
| 7 | V | 12:12 2/2/97 | — | — |

FIG. 3

DEVICE AND METHOD FOR PROCESSING MULTIMEDIA MESSAGE

1. FIELD OF THE INVENTION

The present invention relates to an intermediate type of processing device and a processing method for managing multimedia messages; and more particularly, to a processing device which is able to arrange, store, screen, and print all kinds of multimedia messages from telephone, fax, to e-mail. The processing device also provides an operation interface which is easy to use for the user, and can serve as an intermediate type of processing device for multimedia messages.

2. BACKGROUND OF THE INVENTION

As the electronic technique for communication has progressed in recent years, more and more people have employed telephone, fax, e-mail, and computer network to communicate or propagate routine information. Traditionally, it is necessary to purchase different kinds of appropriate devices to send or receive versatile information in these formats. That is, the user should install telephone, fax machine, computer, and modem separately to utilize the above-mentioned information. It is concerned that there is no efficient way to screen against or block out all the advertisements from those channels. Therefore, the advertisement often rapidly uses up the fax paper or fill up the mail box expelling desired information. In addition, the user has to worry that the network invader (also called "hacker") gains access to his computer to steal precious data or even implant computer virus to destroy all files on storage mediums. In order to screen, deliver, and manage e-mail and fax, the prior art need to install a modem and a network board along with a specific purposed software (such as the Microsoft Exchange package provided by Microsoft) on a personal computer, to connect the telephone lines and Internet. However, only few well trained professional computer operators can efficiently employ the software to control the multimedia message due to the complicated installation procedure and user unfriendly operation interface. Common users are often faced with frustration using operation commands via a keyboard with more than one hundred keys after installing hardware and driver, setting parameters, and executing tests. Therefore, it is not suitable for common users to employ the computer software to manage routine multimedia information. Furthermore, it seems to be a waste with respect to the powerful functions of the computer to utilize the computer just to process the information 24 hours a day.

SUMMARY OF THE INVENTION

The object of the present invention is to provide an intermediate type of processing device and a control method to efficiently arrange, store, monitor, and print the multimedia information from telephone, fax, or e-mail in a systematical manner. The processing device can serve as a port for the multimedia information to temporarily reside and then to be checked and integrated for next advanced treatment. There is no worry about losing any important information and the network invaders can not easily gain access to the computer. The processing device supplies an intimate interface easy to operate for users, which is similar to common home appliances.

Another object of the present invention is to provide an intermediate type of processing device for managing and controlling the multimedia information from telephone, fax, or e-mail. The intermediate type of processing device is composed of a telephone, a fax, an input/output device, a display device, a control panel device, a printing device, and a power supply. After receiving an external information, the processing device can automatically judge the form of the information and execute treating, storing, and displaying on the display device. For example, if the external information is a telephone call, the processing device starts to ring in order to inform the user, and automatically switches to message-recording mode after a predetermined period of time without listening to this telephone information. The recorded message is shown on the display device. If the external information is a fax determined by the processing device, the content of the fax will be stored in an internal storage unit (e.g., a hard disk) as a pattern file. Similarly, information about storing the fax is shown on the display device. If the external information is an e-mail, the content of the e-mail will be stored in the internal storage unit as an electronic file such as text, pattern, or phonetic file, and information about the e-mail is shown on the display device.

Further object of the present invention is to provide an intermediate type of processing device, which can detect the ID of the fax received to directly print out the fax if the ID is one of the allowed customers, or to temporarily store the content in the storage device until the user decides on printing out, showing on the display device, or deleting the fax if the ID is not one of the allowed customers.

Further object of the present invention is to provide an intermediate type of processing device, which utilizes the storage device of the processing device to temporarily store the e-mail or other file from Internet or other computer network instead of being allowed into the computer. The user can show the e-mail or the file on the display device and then determine to print out, transfer to the computer, or delete it, such that the e-mail box is under protection to screen out most trivial advertisement messages, and the computer is protected against the network invaders and the computer virus carried by the e-mail or the file.

Further object of the present invention is to provide an intermediate type of processing device, which supports remote access in a read-only manner. The user may accomplish a file on the computer and transfer the content to the processing device through a parallel port for other remote users to download the file, or to send message back into the processing device.

Further object of the present invention is to provide an intermediate type of processing device, which can determine which kind of the message is received by a DAA (Data Access Arrangement) control unit in the processing device, and decide which way to treat the message. A CPU (Central Processing Unit) in the processing device controls the communication with peripherals such as storage device, print device, telephone device, and so forth, to proceed managing, storing, printing, and displaying for the multimedia messages.

Further object of the present invention is to provide an intermediate type of processing device, which supports 24 hours a day for receiving the external messages without loss. All the newspapers and magazines may be transferred or downloaded to the processing device directly without procedures for printing and sending. The processing device further supports a transportation channel for electronic files with more convenience, more environmental protection, lower cost, and lower consumption of energy.

Other features and advantages of the present invention will become apparent from the following description which refers to the accompanying drawings.

BRIEF DESCRIPTION OF THE DRAWINGS

FIG. 3 illustrates an index data shown on the display device in accordance with an embodiment of the present invention.

DETAILED DESCRIPTION OF THE PREFERRED EMBODIMENTS

Figure 1:
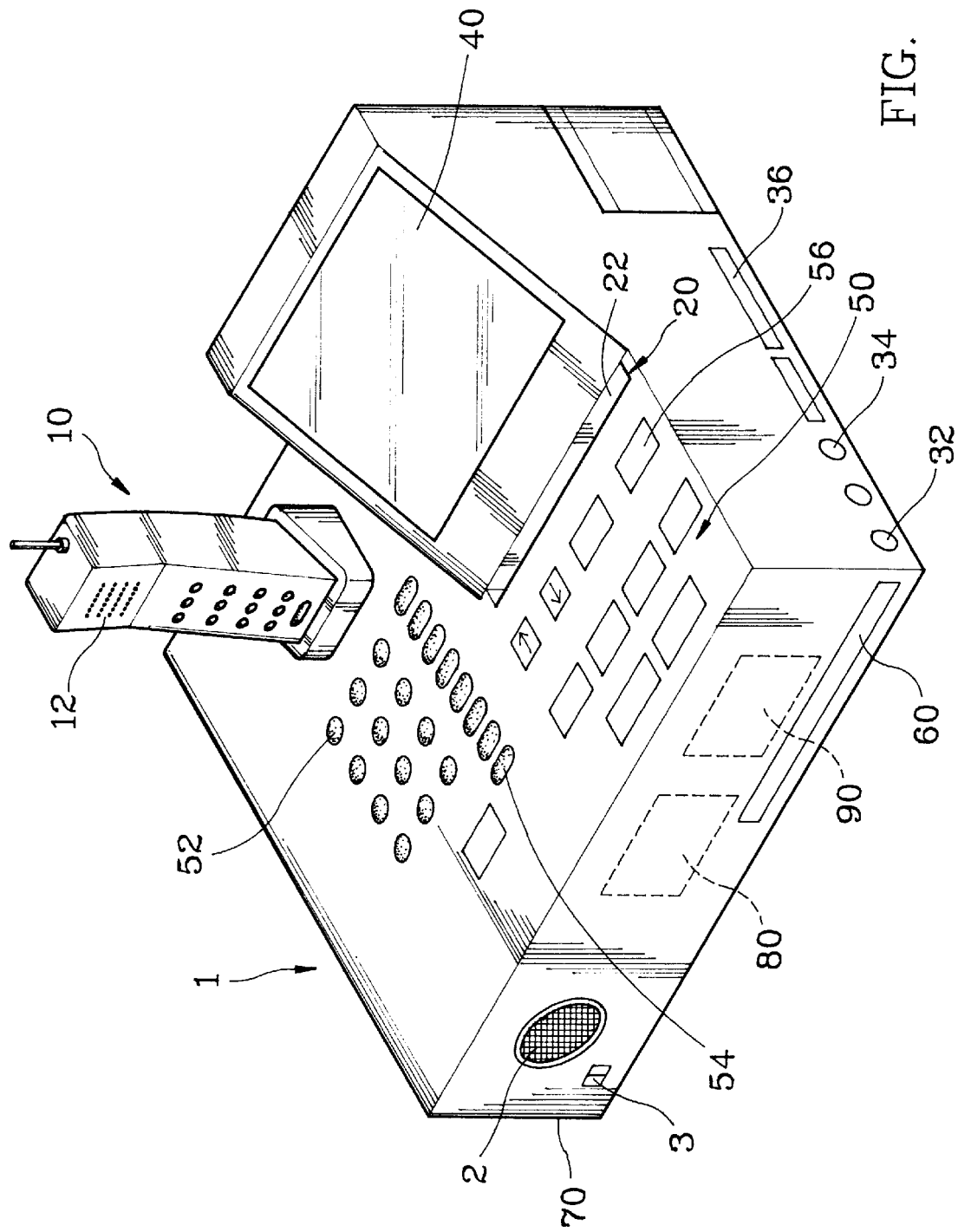
FIG. 1 shows a 3-D schematic diagram of the processing device in the present invention.

With reference to FIG. 1, an intermediate type of processing device 1 for external message in accordance with the present invention includes a telephone device 10, a facsimile device 20, an input/output (I/O) device 30, a display device 40, a control panel device 50, a printing device 60, and a power supply 70. The processing device 1 of the present invention further builds in a control unit 80 and a data storage unit 90.

The telephone device 10 and facsimile device 20 have functions of common telephone and facsimile, respectively. The user may make a call by taking up a telephone arm 12 and dialing the desired telephone number as common operation for the conventional telephone. The facsimile device 20 provides fax function for document. The document slot 22 is used to insert a document (not shown in the figure) to fax to the destination by simple operation as conventional, including dialing and pushing a fax button.

The input/output (I/O) device 30 includes a line socket 32 for at least one telephone line to connect to the telephone network; a network socket 34, which may be RJ-45 or BNC type, to connect to Internet network system; and at least one parallel port 36 to connect to a computer or a printer (not shown in the figure). The control panel device 50 includes a plurality of number keys 52 to dial and input control command; a plurality of hot keys 54 to achieve functions of fast dialing and executing macro or batch commands; and a plurality of function keys 56 with corresponding patterns or abbreviation characters of the functions for the user to easily control and manage the processing device 1.

When an external multimedia message is received by the processing device 1 through the input/output (I/O) device 30, the message will be screened and arranged by the control unit 80. If the message is through the telephone line, including a telephone or facsimile message, the control unit 80 will keep ringing for a predetermined period of time (e.g., one or three rings) to wait for the user to take up the telephone arm 12, and the control unit 80 will directly receive the message after the predetermined time. If the message is a facsimile, the control unit 80 will store the message in the storage unit 90 as a graphic file (e.g., BMP, TIF, or GIF standard compressed format). At the same time an index data, which indicates related information and is generated by the control unit 80, is shown on the display device 40. If the external message is a telephone call, the control unit 80 allows the ringing to last for another predetermined time (e.g., five or seven rings) to wait for the user to take up the telephone arm 12. If the telephone arm 12 is still not picked up within the additional predetermined time, then the control unit 80 will automatically trigger the voice record and reply function to record the message in the storage unit 90 as a voice file (e.g., WAV standard compressed format). At the same time a related index data is generated and shown on the display device 40.

When a message of e-mail or electronic data file enters the processing device 1 through the network socket 34, the control unit 80 will automatically detect and determine the type of the message, and store the message in the storage unit 90 as a text file (e.g., TXT format), graphic file (e.g., BMP, TIF, or GIF format), or a binary file. At the same time a corresponding index data is shown on the display unit 40. The user may easily understand the basic information related to the external message just by browsing the index data shown on the display device 40, including the type of data, input time, ID, data size (bit number or recording time), processing priority, and treatment procedure. The user may select appropriate function keys 56 to preview the content of a desired message on the display device 40, to print out a data file via the printing device 60, to transfer a data file to another computer (not shown in the figure) through the parallel port 36, or to delete a data file from the storage unit 90. In addition, a speaker 2 and a microphone 3 may be installed on the processing device 1 to support the user to play the voice file and record the voice message. The power supply 70 provides the power source to the processing device 1.

Figure 2:
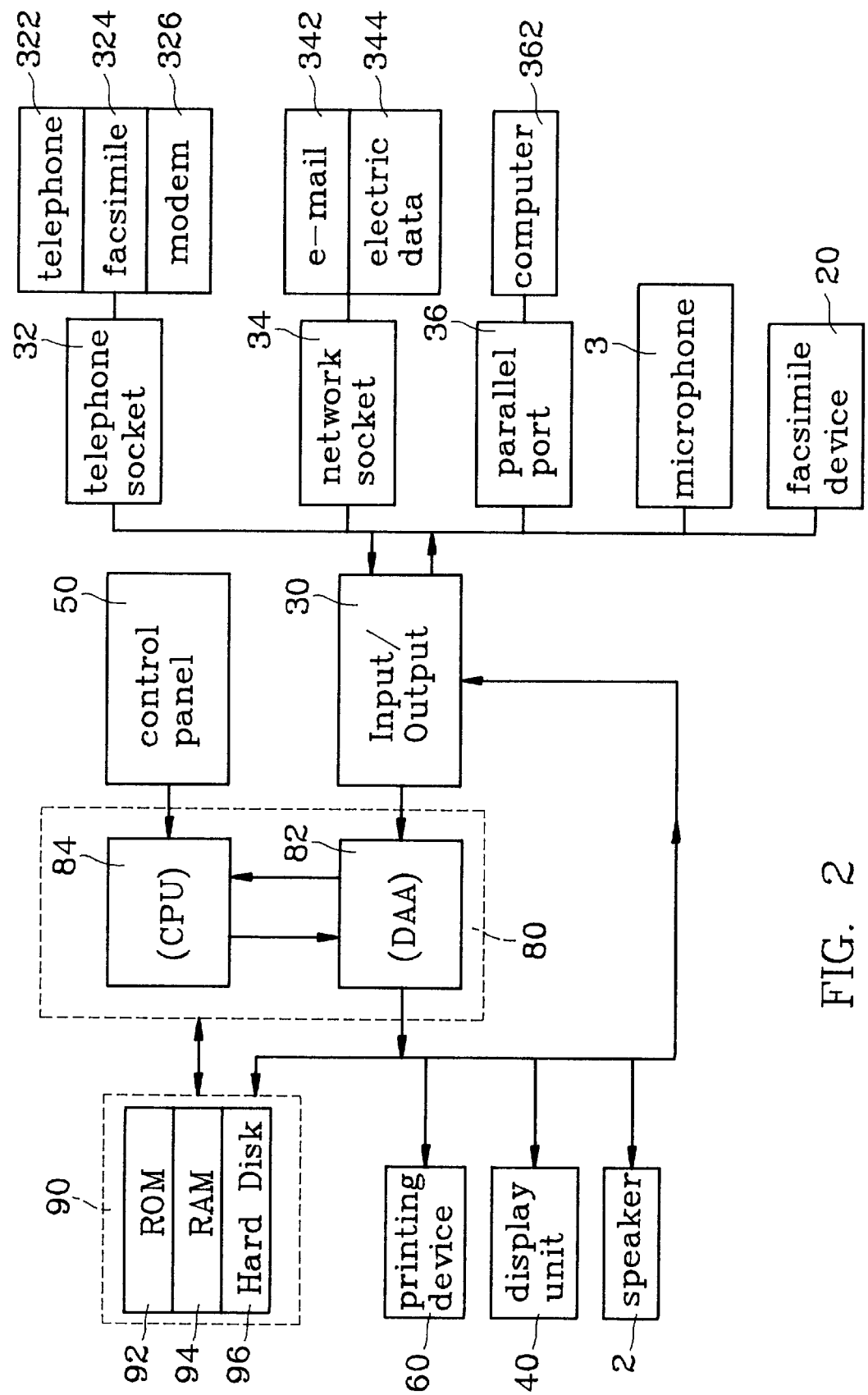
FIG. 2 illustrates a function block diagram of the processing device in the present invention.

With reference to FIG. 2, the function block diagram of the present invention illustrates that the control unit 80 includes a Data Access Arrangement (DAA) 82 and a Central Processing Unit (CPU) 84. The DAA 82 manages the functions of receiving, transmitting, and determining the type of message. The CPU 84 handles the operation for all built-in devices in the processing device 1. The storage unit 90 includes a Read Only Memory (ROM) 92, a Random Access Memory (RAM) 94, and a hard disk 96. The ROM has a firmware as a system program to control, drive, or manage the DAA 82 and the CPU 84. The RAM 94 is used to store the data file which is read out or written in at high frequency, such as the file shown on the display unit 40 for the user to preview. The hard disk 96 is used to store a large amount of data at low cost.

The input message of the control unit 80 comes from the control panel device 50 and the input/output (I/O) device 30. The telephone line socket 32 provides an input channel for a telephone 322, a facsimile 324, and a modem 326. The network socket 34 serves as an input channel for an e-mail 342 and an electronic data file 344 from Internet. The parallel port 36 is used to support communication with another computer 362. The user may input voice message by the microphone 3, or image message by the facsimile device 20. All the input messages are stored in the storage unit 90 by the control unit 80. The stored voice data can be played out by the speaker 2 or transferred to other output device through the telephone line socket 32, the network socket 34, or the parallel port 36.

While receiving an external message, firstly the control unit 80 determines that the message comes from the control panel device 50 or the I/O device 30. The control unit 80 further determines which socket the message comes from if the message comes from the I/O device 30. The control unit 80 keeps the telephone ring to last for a predetermined time to wait for the user to take up the telephone 322 if the message comes from the telephone line socket 32. The control unit 80 will temporarily stop if the user takes up the telephone 322 during the predetermined time. At this time, the user may directly listen to the telephone if the external message is a telephone call, or the user may push appropriate function keys on the control panel device 50 to allow the control unit 80 to manage if the external message is a facsimile or some message from the modem 326. The control unit 80 will directly manage the external message after the predetermined time without picking up the telephone. The control unit 80 determines the type of message and takes appropriate means for a facsimile 324 or a message from the modem 326 (continuously ringing as usual). If the message is not a facsimile 324 or does not come from the modem 326, the external message is determined as a voice message by the control unit 80, and the ring is allowed to last for another predetermined time to wait for the user to take up the telephone. After this predetermined time without taking up the telephone by the user, the control unit 80 will automatically trigger the functions of voice record and answering. The user may leave a message via the microphone 3 to instruct the incoming telephone call to execute the record operation.

The user may edit some text or graphic file on the computer (not shown in the FIGs) and then store the file into the processing device 1 through the parallel port 36. The stored file may be provided for other remote users to download by remote access via Internet from the network socket 34 or the modem 326 from the telephone line socket 32. The processing device 1 further provides a function similar to "Home Page at Home" and protects the computer against the hackers.

In addition to determining the type of message and storing the message, the control unit 80 also supports macro command for the user to execute a series of specific predetermined functions, such as printing, displaying, or playing. At the same time the control unit 80 generates a corresponding index data and shows the index data on the display device 40 for the user to monitor and preview the basic information about the external message into the processing device 1, including the type of message, input date and time, title, and status of management.

With reference to FIG. 3, an index data list on the display device 40 includes the following items:

(1) NO: number of the input message;
(2) TYPE: type of message, further including:
   "V" (Voice) representing a telephone voice message;
   "E" (E-mail) representing an e-mail message;
   "F" (Fax) representing a facsimile message;
   "T" (Transfer) representing computer transfer message;
(3) INPUT TIME: input time for the message;
(4) TITLE: message title, representing the telephone number or facsimile ID if the message is a telephone or facsimile, representing the subject if the message is an e-mail, representing data file name if the message is computer communication, or representing a "-" bar if no related title exists;
(5) STATUS: status of message management, further including:
   "S" (Showed) representing that the message has been previewed (e.g., shown on the display device or played by the speaker);
   "P" (Printed) representing that the message has been printed out by the printing device;
   "T" (Transferred) representing that the message has been transferred to another computer;
   "-" (Null) representing that the message has not been treated or is a new message.

The user may move the cursor on the display device 40 by the control panel device 50 to select appropriate functions such as previewing or playing "S", printing out", transferring to another computer "T", or deleting the message (Delete). The function of delete will eliminate both the message from the hard disk 96 and the index data from the display device 40. In general, all the message data will be stored in the hard disk 96 unless deleted, so the user has to periodically delete the message data which is previewed, played, printed out, or transferred, in order to reserve sufficient memory space for new message. If the hard disk 96 is filled with message data, the new message data will automatically overwrite the oldest message data by the control unit 80.

Figure 4:
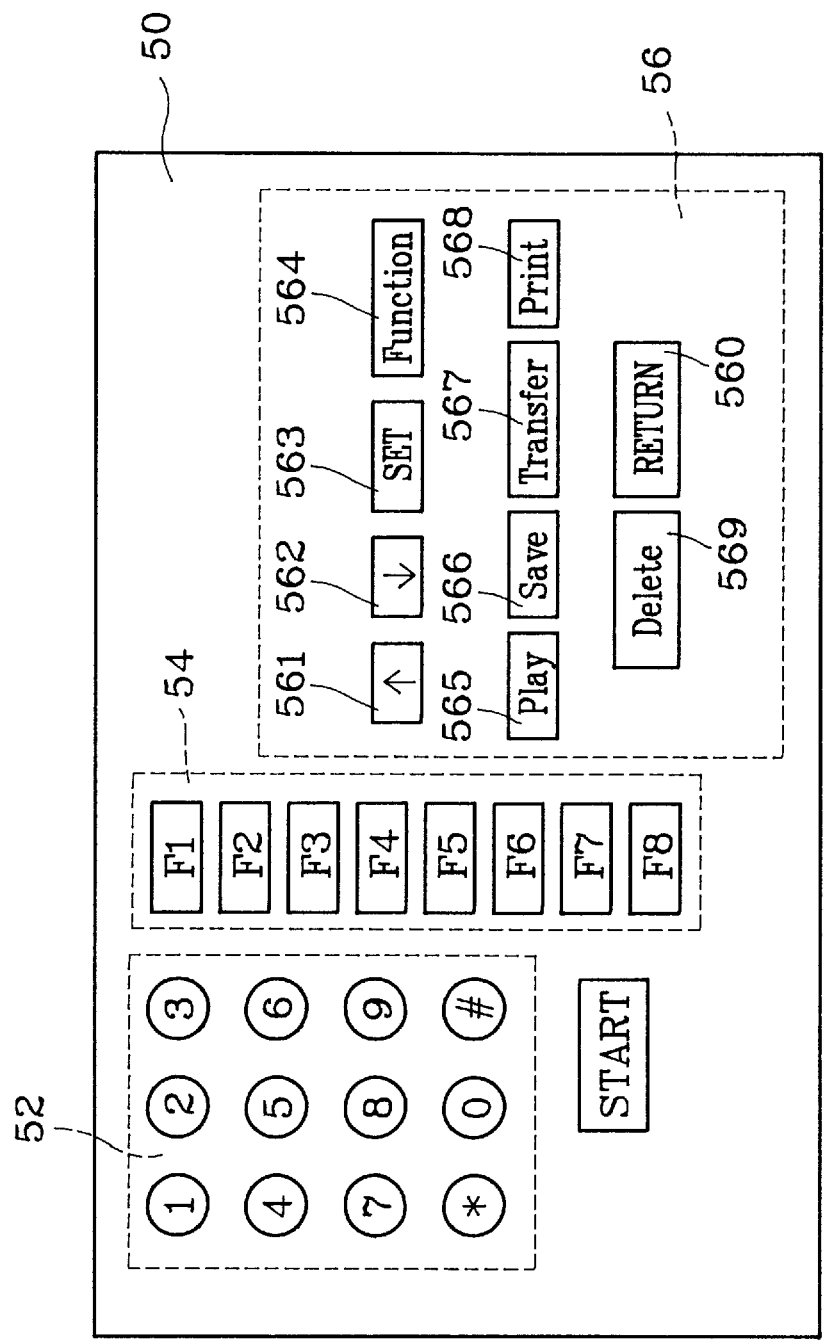
FIG. 4 illustrates a schematic diagram of the control panel device in accordance with an embodiment of the present invention.

With reference to FIG. 4, the control panel device 50 in the present invention includes a plurality of number keys 52, hot keys 54, and function keys 56. The user may push the number keys 52 to dial and utilize the telephone device 10 or facsimile device 20. The function keys 56 allow the user to manage the external message. For example, the direction keys 561 and 562 are used to move the cursor to select a desired index data on the display device 40; The set key 563 and function key 564 are used to set internal system data or special function respectively, for the processing device 1; the play key 565 is used to preview the message on the display device 40 or play the message via the speaker 2 in accordance with the message type which is automatically determined by the control unit 80, including text, graphic, and voice messages; but if the control unit 80 can not determine the external message, this function is automatically invalid; the save key 566 is used to save a record of message data; the transfer key 567 is used to transfer the message data to another computer through the parallel port 36; the print key 568 is used to print out a text or graphic file via the printing device 60, but if the file is not a text or graphic format, this function is automatically invalid; the delete key 569 is used to eliminate a record of data or the input command; and the return key 560 is used to confirm the input command from the user. Furthermore, the user may preset a series of specific functions as a micro command assigned to a hot key 54 to save some operation steps.

The processing device 1 provides remote read-only access function to allow other users to download the message data which is generated by the user through the parallel port 36, or to send back some information to the processing device 1.

The processing device 1 further supports 24 hours a day for receiving the external messages without any loss. All the newspapers and magazines may transfer or download to the processing device I directly without procedures for printing and sending. The processing device 1 also supports a transportation channel for electronic files with more convenience, more environmental protection, lower cost, and lower consumption of energy.

The present invention allows the user to preset a list of fax ID. If the incoming is within the list, the processing device 1 will automatically print out the facsimile, store the message in the storage unit, and shows the index data on the display device 40. At the same time the status is set to "P *" representing that the message is printed out. If the incoming is not in the list, the message is stored but not printed out. The index data will be shown on the display device 40 to inquire the user of the next treatment, so to avoid wasting fax paper. The user may also disable this identifying function to print out all the external messages.

In accordance with the above mentioned, the processing device in the present invention has the following advantages:

(1) All the external messages are shown on the display device and controlled by the processing device, including check and integrate, such that no message will be lost.

(2) All messages are stored in the processing device before being deleted by the user to assure that the message will not be lost.

(3) Selectively printing out the message saves fax paper consumption.

(4) The e-mail or electronic data file is not directly allowed into the computer so as to screen out all garbage files and electronic data files which are suspected to carry virus. The system program of the processing device is installed in the ROM as a firmware such that there is no executable file or system file (such as SYS, COM or EXE format files) saved in the hard disk, and therefore minimize the possibility of the system programs being damaged by the virus or hackers.

(5) All received messages may be stored or transferred to the computer for use later or as a copy.

(6) The user may prepare a text or graphic file on the computer in advance, and then transfer and store the file to the processing device. Other users may download the file by remote access. The processing device provides a function similar to Home Page at Home. The processing device further supports 24 hours a day for receiving the external messages without any lose. All the newspapers and magazines may transfer or download to the processing device directly without procedures for printing and posting. The processing device further supports a transportation channel for electronic files with more convenience, more environmental protection, lower cost, and lower consumption of energy.

(7) The present invention provides a simple operation interface for common users to easily control.

(8) The present invention may automatically determine the type of message, and executes appropriate operation according to the message type to store the message as a standard format file, which is easily transferred to the computer for the user to directly use.

Although only the preferred embodiments of this invention were shown and described in the above description, it is requested that any modification or combination that comes within the spirit of this invention be protected.

What is claimed is:

1. An intermediate type of processing device with a friendly operation interface for managing multimedia message which is in the type of a telephone message, facsimile message, e-mail message, or electronic data-file message; said processing device comprising:

a power supply for providing power to said processing device;

an input/output device comprising a telephone line socket for connecting with at least one telephone line, a network socket for connecting with Internet, and at least one parallel port for connecting with a remote computer, wherein said telephone line socket is used for sending and receiving telephone and facsimile messages, said network socket is used for sending and receiving E-mail messages, and said parallel port is used for sending and receiving electronic data-file messages;

a telephone device connected with said input/output device for use as an ordinary telephone;

a facsimile device connected with said input/output device for use as an ordinary fax machine;

a control panel device, which comprises a plurality of number keys and function keys, wherein each key has a pattern or abbreviated characters on key surface with respect to function;

a printing device;

a display device;

a data storage unit, which comprises a ROM, a RAM, and a hard disk, wherein said ROM stores a system program as a firmware for driving said processing device, said RAM stores data files frequently used, and said hard disk is used to store data files occupying a large amount of memory space for a long time at low cost; and a control unit, which comprises a DAA managing and automatically determining a type of incoming multimedia message, and a CPU controlling operations of devices in said processing device, wherein said control unit automatically determines said type of said message and generates a respective index data shown on said display device for a user to easily monitor; wherein said control panel device provides said function keys for said user to utilize functions of previewing said message on the display device, printing said message out via said printing device, transferring said message to said remote computer through said parallel port, faxing said message out through said facsimile device, storing said message within the hard disk, and deleting said message; wherein said index data includes at least a series number of message, a message type, an input time of message, a title of message, and a status for message management.

2. A processing device of claim 1, wherein said control panel device further comprises a plurality of hot keys to allow the user to preset a series of specific functions as a micro command assigned to a desired hot key.

3. A processing device of claim 1, further comprises a speaker and a microphone.

4. A processing device of claim 1, wherein said message type in said index data comprises:

"V" representing a telephone message;

"E" representing an e-mail message;

"F" representing a facsimile message; and

"T" representing a computer transfer message.

5. A processing device of claim 1, wherein said status of management comprises:

"S" representing that said message is previewed;

"P" representing that said message is printed out;

"T" representing that said message is transferred to another computer; and

"-" representing said message has not been treated.

6. A processing device of claim 1, wherein said storage unit is used to store text, graphic, and voice files generated by the user for other remote user to download by remote access, which provides a function similar to Home Page at Home and allows said remote users to send back related information to said processing device.

7. A processing device of claim 1, further provides a function for receiving said message 24 hours a day, which allows all data of newspapers and magazines to be directly downloaded into said processing device such that said processing device may save procedures for printing and posting with more convenience at lower cost.

8. A processing device of claim 1, wherein said function keys comprise a direction key, a set key, a function key, a store key, a print key, a delete key, and a return key.

9. A processing method for managing multimedia messages from a telephone, a facsimile, an e-mail, or an electronic file to check and integrate by a processing device, wherein said processing device comprises an I/O device connected to a telephone line, Internet and a remote computer for receiving and sending multimedia messages, a display device, a control unit for determining a message type and managing said message, a storage unit for storing said message, and a control panel device for a user to control said processing device; said processing method comprising:

(a) determining said message type:
    automatically determining that said message received from said I/O device is a message for said telephone, said facsimile, said e-mail, or said electronic data file;

(b) storing said message:
    temporarily storing said message into said storage unit as a standard format according to said message type such as a voice format for said telephone message, a graphic format for said facsimile message, a text format for said e-mail message, and a binary format for electronic data file, for the user to proceed next operation;

(c) building up an index data:
    generating said respective index data, which comprises at least message number, message type, status of management, and input time;

(d) looking up said index data and managing said message:
    controlling said control panel device to look up said index data and manage said messages, such as previewing, printing, transferring to another computer, or delete said message.

10. A method of claim 9, wherein said message type in said index data comprises:

"V" representing a telephone message;

"E" representing an e-mail message;

"F" representing a facsimile message; and

"T" representing a computer transfer message.

11. A method of claim 9, wherein said status of management comprises:

"S" representing that said message is previewed;

"P" representing that said message is printed out;

"T" representing that said message is transferred to another computer through a computer network; and "-" representing said message is not treated.

* * * * *